(12) United States Patent
Mahan (10) Patent No.: US 9,062,565 B2
(45) Date of Patent: Jun. 23, 2015

(54) GAS TURBINE ENGINE CONTAINMENT DEVICE

(75) Inventor: Vance A. Mahan, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 898 days.

(21) Appl. No.: 12/839,824

(22) Filed: Jul. 20, 2010

(65) Prior Publication Data

US 2011/0154801 A1 Jun. 30, 2011

Related U.S. Application Data

(60) Provisional application No. 61/291,561, filed on Dec. 31, 2009.

(51) Int. Cl.
*F01D 25/28* (2006.01)
*F01D 21/04* (2006.01)

(52) U.S. Cl.
CPC .......... *F01D 21/045* (2013.01); *F01D 25/285* (2013.01); *Y02T 50/672* (2013.01); *F05D 2230/60* (2013.01)

(58) Field of Classification Search
USPC .......... 29/521, 525, 889.2, 889.7; 415/9, 173, 415/4, 174.4, 200, 214.1
See application file for complete search history.

(56) References Cited

U.S. PATENT DOCUMENTS

| | | | |
|---|---|---|---|
| 2,935,294 A | 5/1960 | Angell et al. | |
| 3,241,813 A * | 3/1966 | Von Flue et al. | 415/9 |
| 4,149,824 A * | 4/1979 | Adamson | 415/9 |
| 4,417,848 A | 11/1983 | Dembeck | |
| 4,422,648 A | 12/1983 | Eaton et al. | |
| 4,639,188 A * | 1/1987 | Swadley | 415/9 |
| 4,728,257 A | 3/1988 | Handschuh | |
| 5,267,828 A | 12/1993 | Lenhart et al. | |
| 5,328,324 A * | 7/1994 | Dodd | 415/9 |
| 5,558,494 A | 9/1996 | Chambers | |
| 5,685,693 A | 11/1997 | Sexton | |
| 6,113,349 A | 9/2000 | Bagepalli et al. | |
| 6,146,089 A | 11/2000 | Allen et al. | |
| 6,394,746 B1 * | 5/2002 | Sathianathan et al. | 415/9 |
| 6,406,256 B1 | 6/2002 | Marx | |
| 6,514,041 B1 * | 2/2003 | Matheny et al. | 415/177 |
| 6,537,020 B2 | 3/2003 | Humhauser | |
| 6,575,694 B1 * | 6/2003 | Thompson et al. | 415/9 |
| 6,814,538 B2 | 11/2004 | Thompson | |

(Continued)

OTHER PUBLICATIONS

International Search Report and Written Opinion, PCT/US2010/062500, Rolls-Royce Corporation, The International Searching Authority, United States Patent and Trademark Office, Apr. 6, 2011.

*Primary Examiner* — Nathaniel Wiehe
*Assistant Examiner* — Woody A Lee, Jr.
(74) *Attorney, Agent, or Firm* — Krieg Devault LLP (57) ABSTRACT

A fan containment system for a gas turbine engine, and a method of making the same, is disclosed that in one embodiment includes casing that surrounds at least a portion of a plurality of fan blades. In one form, a pair of standoff rings is formed in an outer surface of the casing that are spaced apart from one another a predetermined distance running circumferentially about the inner nacelle ring. A containment ring is positioned around a radially outer surface of the standoff rings to form an interference fit between the two.

20 Claims, 5 Drawing Sheets

(56) References Cited

U.S. PATENT DOCUMENTS

| | | |
|---|---|---|
| 6,863,495 B2 | 3/2005 | Halliwell et al. |
| 7,604,199 B2 * | 10/2009 | McMillan et al. .......... 244/53 R |
| 8,191,254 B2 * | 6/2012 | Cardarella, Jr. .............. 29/889.2 |
| 2001/0028840 A1 | 10/2001 | Booth |
| 2004/0071548 A1 | 4/2004 | Wilson, Jr. |
| 2006/0013681 A1 | 1/2006 | Cardarella |
| 2006/0257240 A1 | 11/2006 | Naskali et al. |
| 2009/0272122 A1 | 11/2009 | Shi et al. |

* cited by examiner

GAS TURBINE ENGINE CONTAINMENT DEVICE

CROSS REFERENCE TO RELATED APPLICATIONS

The present application claims the benefit of U.S. Provisional Patent Application 61/291,561, filed Dec. 31, 2009, and is incorporated herein by reference.

TECHNICAL FIELD

The present invention relates to gas turbine engines and more particularly, to a containment system for gas turbine engine rotating components.

BACKGROUND

Gas turbine engines have numerous industrial and motive applications, and may be used in many situations to provide power and/or thrust. Typical gas turbine engines include rotating turbomachinery such as compressors, fans, and turbines. The rotating turbomachinery may be used in these applications to provide compression and extract work and may include rotors having several blades capable of rotating at high speeds. A possibility exists that such blades, or portions thereof, could become detached from the rotating turbomachinery during operation of the gas turbine engine. Containing the detached blades and/or mitigating any resulting damage from a loose blade or portion thereof remains an area of interest. Some existing systems have various shortcomings relative to certain applications. Accordingly, there remains a need for further contributions in this area of technology.

SUMMARY

One embodiment of the present invention is a unique containment mechanism for a gas turbine engine. Other embodiments include apparatuses, systems, devices, hardware, methods, and combinations for containing blades of gas turbine engines. Further embodiments, forms, features, aspects, benefits, and advantages of the present application shall become apparent from the description and figures provided herewith.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
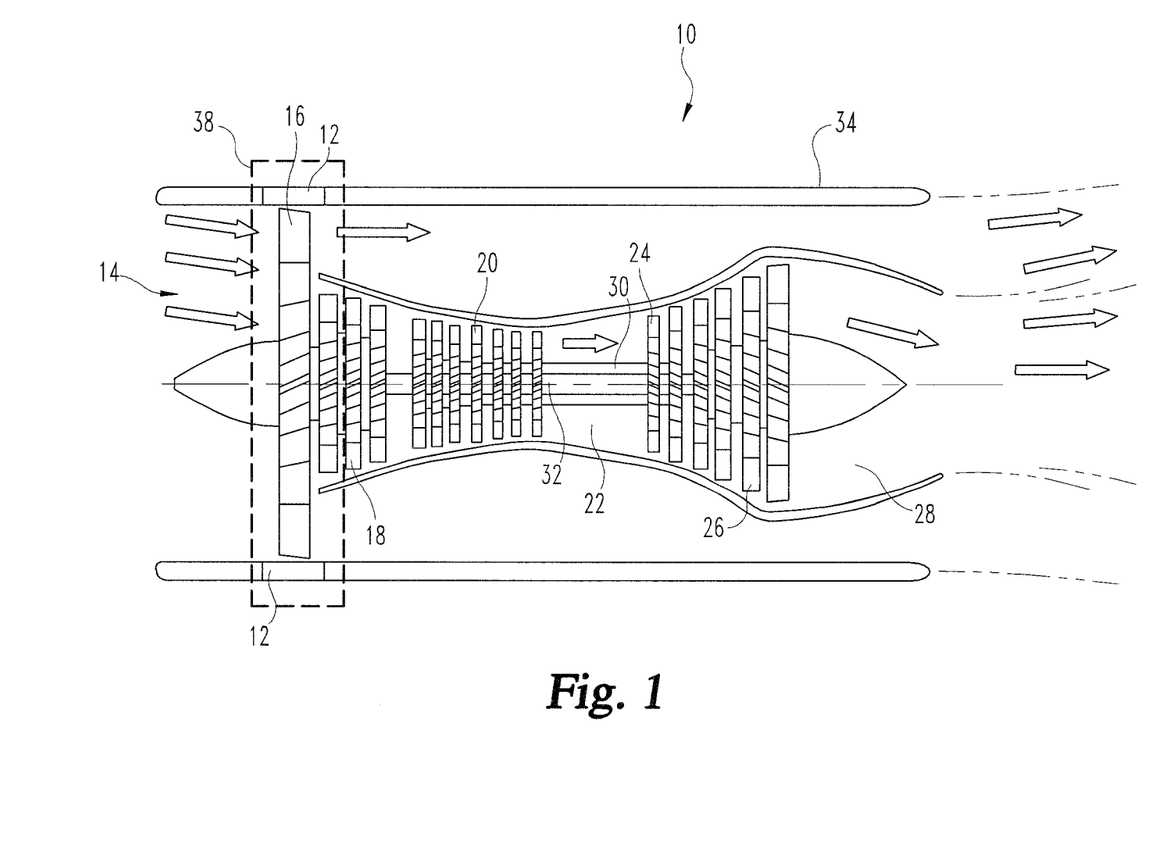
FIG. 1 is a cross section of a turbofan engine including one embodiment of a containment system.

Referring to FIG. 1, a gas turbine engine 10 useful for providing power for an aircraft is depicted having a containment system 12. The containment system 12 can be used to contain objects such as a separated blade of the gas turbine engine 10 and reduce/minimize/eliminate damage caused to the gas turbine engine 10 and/or aircraft as a result. As used herein, the term "aircraft" includes, but is not limited to, helicopters, airplanes, unmanned space vehicles, fixed wing vehicles, variable wing vehicles, rotary wing vehicles, hover crafts, vehicles, and others. Further, the present inventions are contemplated for utilization in other applications that may not be coupled with an aircraft such as, for example, industrial applications, power generation, pumping sets, naval propulsion and other applications known to one of ordinary skill in the art.

The gas turbine engine 10 is depicted as a turbofan in the illustrative embodiment, but can take on different forms in other embodiments such as a turbojet, turboshaft, or turboprop, to set forth just three non-limiting examples.

The gas turbine engine 10 includes an air inlet 14 that provides air to a fan 16, a low pressure (LP) compressor 18 and a high pressure (HP) compressor 20, all three of which may used to accelerate and compress the incoming air. In some forms the gas turbine engine 10 may or may not include the fan 16 and may include more or fewer compressor sections than those depicted in the illustrative embodiment. A compressed air stream is delivered from the compressor sections to a combustor 22 where it is mixed with fuel and burned before entering a high pressure (HP) turbine 24 and a low pressure (LP) turbine 26. In some forms, the gas turbine engine can include more or fewer turbine sections. Additionally, in some forms the gas turbine engine can have any variety of combustors such as a pulse detonation combustor or wave rotor, to set forth just a few non-limiting examples. The turbines 24 and 26 may extract energy from the flow stream leaving the combustor 22 to power one or more of the fan 16, LP compressor 18, and the HP compressor 20. After passing through the turbines 24 and 26 the flow stream may then exit the gas turbine engine 10 to the atmosphere via a nozzle 28. The nozzle 28 may take on any form, such as a convergent or convergent-divergent (CD) nozzle, which may or may not be actuatable, to set forth just a few non-limiting examples.

A high pressure (HP) shaft 30 and a low pressure (LP) shaft 32 are included in the embodiment of the gas turbine engine 10 to couple the rotatable components. For example, the HP shaft 30 connects the HP compressor 20 to the HP turbine 24. Likewise, the LP shaft 32 connects the fan 16 and the LP compressor 18 to the LP turbine 26. Other arrangements of the shafts between the fan, compressor sections, and turbine sections are also contemplated herein. As will be appreciated, the shafts 30 and 32 carry power from the turbines 24 and 26 to drive the fan 16 and compressors 18 and 20. The two shafts 30 and 32 are capable of rotating at independent speeds. In some embodiments more or fewer shafts may be provided to transfer power between the rotatable components. Additionally, one or more of the fan, the compressor sections, and the turbine sections may be geared or may be provided with a clutch to modulate power and/or change rotational speed.

Figure 2:
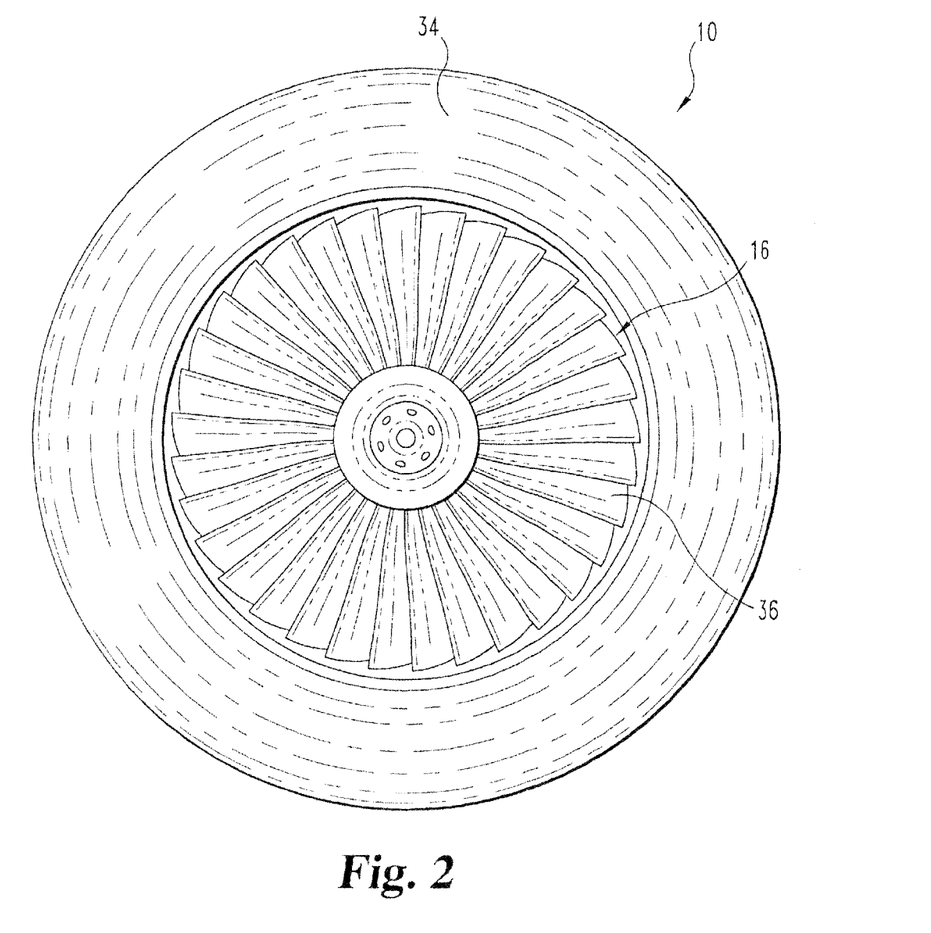
FIG. 2 is a front view of the turbofan engine illustrating a fan and nacelle configuration.

Referring to FIGS. 1 and 2, a nacelle 34 may be provided that covers or houses the internal components of the gas turbine engine 10. The nacelle can take the form of a covered housing and may be separate from the aircraft and/or gas turbine engine 10. In addition, the nacelle 34 can form part of a flowpath as air enters the air inlet 14. Other flowpath structure may also be used in lieu of or in addition to the nacelle 34. A portion of the nacelle 34 can include the containment system 12, though in some embodiments the nacelle 34 may include multiple portions having one or more containment systems 12. In other embodiments the containment system 12 can be located other than with the nacelle 34. As will be appreciated, the fan 16 includes a plurality of circumferentially spaced apart fan blades 36 that protrude outwardly from a central portion of the fan 16 toward the nacelle 34. The containment system 12 can be provided to contain one or more fan blades 36 that become detached from the fan 16. In some forms the containment system 12 can be designed to contain other rotating components of the gas turbine engine 10, such as a compressor blade or turbine blade, to set forth just a few non-limiting examples. If the fan blades 36 or other rotating components become detached, the containment system can be constructed in some forms to retain the debris so that the gas turbine engine 10, the aircraft and/or its occupants are not further damaged or injured by debris that may be traveling at relatively high speeds.

Figure 3:
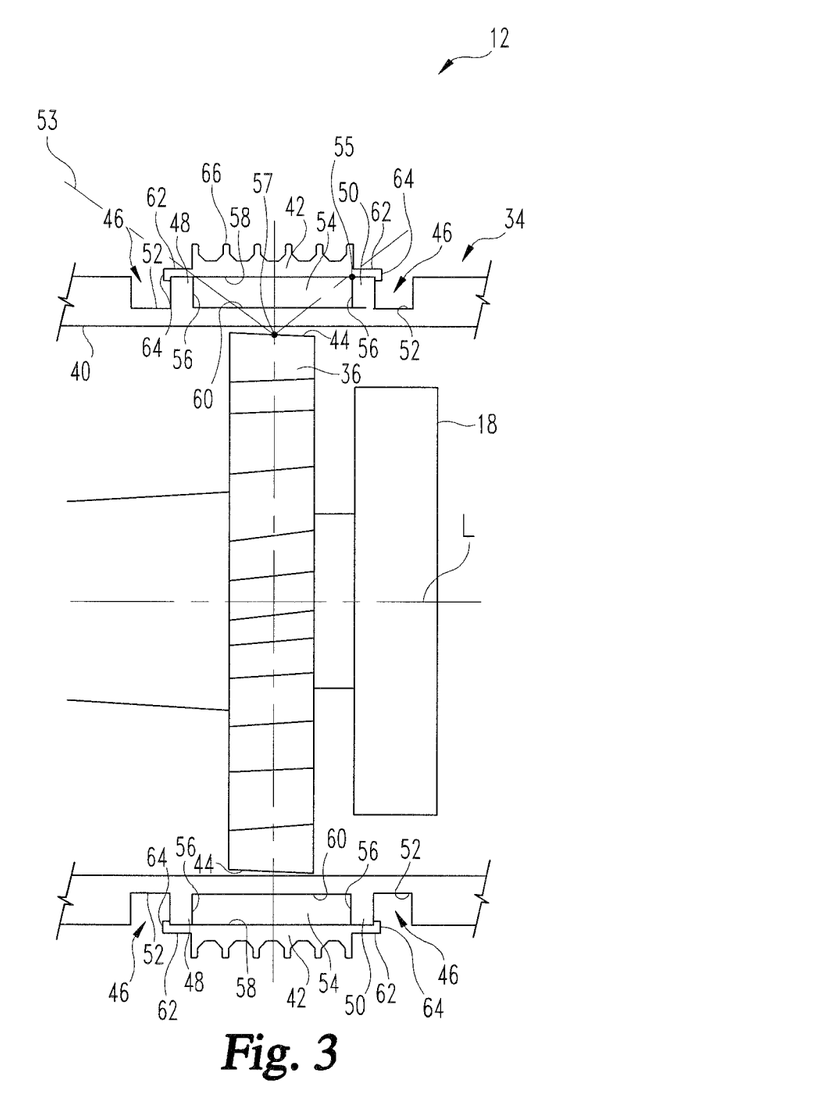
FIG. 3 is a partial cross section of an embodiment of a containment system for a gas turbine engine.

Referring to FIG. 3, which represents a portion of the gas turbine engine 10 outlined by hashed box 38 in FIG. 1, an illustration of one form of the containment system 12 is set forth. The containment system 12 in the illustrative embodiment includes a casing 40 and a containment ring 42 that are positioned around a portion of the rotational path of the fan blades 36, often referred to as the blade track. While the containment ring 42 is positioned around the portion depicted in FIGS. 1 and 3, it will be appreciated that the containment ring 42 can be positioned around other portions of the gas turbine engine 10 in other embodiments. For example, the containment ring 42 can extend to cover two or more blade tracks, or extend over portions of more than one blade track. In some forms, the containment ring 42 can be positioned around one or more blade tracks, or portions thereof, of either the LP compressor 18 or the HP compressor 20.

The casing 40 can take many forms in various embodiments, such as a fan casing or other flowpath structure, to set forth just two non-limiting embodiments. Though the casing 40 is depicted as forming a boundary for a flow path internal to the gas turbine engine 10, in some forms the casing 40 can merely be an intermediate structure such that other additional structure forms the boundary of the internal flowpath. For example, an abradable shroud can be disposed adjacent to the casing 40 to form part of the internal flowpath. Therefore as will be appreciated, the term flowpath structure can refer to structures that either directly define a surface of a flowpath, or can be connected to a subsequent component that forms a surface of a flowpath. The casing 40 can be formed of a variety of materials or constructions, including aluminum or a composite material, to set forth just a few non-limiting examples. In some forms, a gap may be present in the internal flowpath between an inside diameter (ID) of the casing 40 and an outside diameter (OD) of the outer tips 44 of the fan blades 36. The gap can have any variety of dimensions to suit the needs or objectives of any given application.

In some applications the casing 40 can include a first standoff ring 48 and a second standoff ring 50, though in some forms fewer or more standoff rings can be provided. The standoff rings 48 and 50 extend from a base 52 of the casing 40 at a distance sufficient for any given application. Either or both of the standoff rings 48 and 50 can extend at any angle from an axis L of the gas turbine engine 10. In one form the standoff rings 48 and 50 together extend perpendicular to the axis L. Though the standoff rings 48 and 50 are depicted as extending in a straight line from the base 52, in some forms either or both of the standoff rings 48 and 50 may extend in any arbitrary shape, such as curvilinear or piece-wise linear, to set forth just a few non-limiting examples. In one non-limiting form, the standoff rings can extend radially outwardly from the base 52 to a point 55 intersected by a line 53, such as, but not limited to a line drawn at about fifteen (15) degrees, from a midpoint 57 at the outer tip 44 of the blade 36. Other orientations are also contemplated. In some forms the surface or surfaces of the standoff rings 48 and 50 can have any type of finish or texture. In some forms additional structure/coatings/material may be added to the standoff rings. The standoff rings 48 and 50 can vary in width and can be spaced apart a sufficient distance such that they are both located on either side of the blades 36. In some forms a midpoint between the standoff rings 48 and 50 may be located at the same axial station as the midpoint 57 of the blades 36. In still other forms, one or more of the standoff rings can be aligned at locations such as, but not limited to, an edge of the blades 36. The standoff rings 48 and 50 can extend circumferentially around an annulus of the gas turbine engine 10. In one embodiment, one or more of the standoff rings 48 and 50 can be segmented into multiple rings that occupy separate circumferential sections of the gas turbine engine 10, some or all of which may occupy different axial stations. In yet still other forms, the standoff rings 48 and 50 may be formed as cutouts in the base 52 using any of the variations discussed above.

The casing 40 can include standoff ring cavities 46 formed on either side of the standoff rings 48 and 50. The standoff ring cavities 46 can be formed circumferentially around the entire casing 40. In some forms the standoff ring cavities 46 may not be present. In lieu of a single circumferential cavity 46, multiple cavities may also be present in some forms such that multiple circumferentially disposed cavities are formed. Structure or other devices may be used to create/form the multiple cavities 46.

The containment ring 42 can take many forms in various embodiments and can be formed from a variety of materials. In one form the containment ring 42 can be formed from steel, titanium, a composite material, or other material that is durable enough to withstand the impact of a fan blade 36 that may become separated during operation of the gas turbine engine. The containment ring 42 can be formed of other materials or constructions as well. The containment ring 42 can have an axial width that extends on either side of the blades 36. In one non-limiting form the containment ring 42 extends to a point intersected by a line, such as but not limited to a line drawn at least fifteen (15) degrees, from a midpoint of the blades 36. In another non-limiting form, the containment ring 42 can extend to an outer edge of the outer tips 44 of the fan blades 36. In some forms the containment ring 42 can be unitary, but in other forms the containment ring 42 may be composed of multiple segments that may be constructed/assembled to form an annular shape.

The radially outer portion of the containment ring 42 can include a plurality of ribs 66 formed circumferentially around the containment ring 42 to reduce overall weight. In some forms the ribs 66 may only be partially circumferentially formed. The ribs 66 can extend at any variety of angles and have any variety of thicknesses. Additionally, the ribs 66 may have any form such as linear, curvilinear, or piecewise linear, to set forth just a few non-limiting examples. The ribs may be equispaced along the axial width of the containment ring 42, or may be spaced at unequal intervals.

In some forms the containment ring 42 includes a pair of L-shaped ends 62 located on the ends of the containment ring 42. The L-shaped ends 62 can include a protrusion 64 that protrudes radially inwardly toward the center of the gas turbine engine 10. The protrusion 64 of the containment ring 42 located on the axially forward side of the containment ring 42 can protrude radially inwardly a different distance than the protrusion 64 located on the aft side of the containment ring. The protrusions 64 can protrude at any variety of angles and have any variety of widths. In addition, the protrusions may take any variety of forms such as a bump or other rounded, or partially rounded, object. In some forms the protrusions 64 extend circumferentially around the annular shape of the containment ring 42, but in other forms the protrusions 64 extend only partially around the annular shape of the ring 42. Some forms of the containment ring 42 can have multiple protrusions 64 distributed around the circumferential surface of the containment ring 42. Though the illustrative embodiment depicts the protrusions as extending from the ends of the containment ring 42, in some forms the protrusions can be located axially inward from the end of the containment ring 42, such that the L-shaped ends 62 no longer have an L-shape but rather a T-shape. Some forms of the containment ring 42 can have different shaped ends entirely. The ends of the containment ring 42 need not, but may be, similar to each other.

A blade containment cavity 54 can be formed between the casing 40 and the containment ring 42 in the illustrative embodiment and may be operable to retain a respective fan blade 36, or portion thereof, from exiting the containment ring 42 and/or the nacelle 34 of the gas turbine engine 10. In some forms, however, the blade containment cavity 54 may not be present. In addition, in some forms the blade containment cavity 54 may be filled with a variety of material types, compositions, and forms. The blade containment cavity 54 is formed between the respective inside edges 56 of the first and second standoff rings 48 and 50, the lower surface 58 of the containment ring 42, and an upper surface 60 of the casing 40. The blade containment cavity 54 may have any variety of axial widths and radial depths which can vary circumferentially around the annulus of the gas turbine engine 10. In some forms, the blade containment cavity 54 may, but need not, take a similar form to the standoff ring cavity 46.

In one embodiment the containment ring 42 is secured to the casing 40 through an interference fit formed by the standoff rings 48 and 50 interacting with the protrusions 64 of the containment ring 42. In particular, the outside edges of the standoff rings 48 and 50 are spaced apart a sufficient distance at least equal to, if not slightly larger than, the distance between the inside edges of the protrusions 64. While the standoff rings 48 and 50 are depicted as located between the protrusions 64, in some forms of the containment system 12 the protrusions 64 may be located between the standoff rings 48 and 50. In such forms the standoff rings 48 and 50 can be coupled to the protrusions 64 with additional structure and/or fastening mechanisms.

Figure 3A:
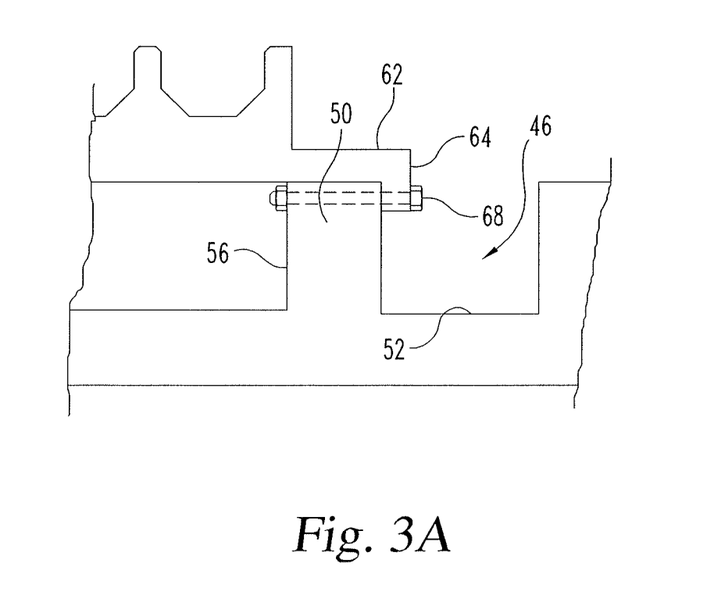
FIG. 3A is a partial cross section of another embodiment of a containment system for a gas turbine engine.

The edges of both the rings 48 and 50 and the protrusions 64 may be in physical contact over substantially their entire surface or at a point or points along their respective surfaces. It will be appreciated, therefore, that the fit between the containment ring 42 and the casing 40 is sufficient to at least partially secure the two together. Some fits may be tighter than others. For example, a relatively tight fit may substantially secure the containment ring 42 to the casing 40 over substantially an entire engine operating envelope and operating conditions environment than others. The fit between the containment ring 42 and the casing 40 may be sufficient to maintain the containment ring 42 in a substantially fixed axial and circumferential relation relative to the casing 40. In some embodiments it may also be desired to supplement the interference fit by mechanically fastening the containment ring 42 to the casing 40. This may be accomplished for example as shown in FIG. 3A at reference numeral 68 by bolting, riveting, welding, or providing any other suitable fastening technique between the protrusions 64 and the standoff rings 48 and 50. In one form the containment ring 42 may be thermally press fit to the casing 40. Structure other than the protrusions 64 and standoff rings 48 and 50 on either or both the containment ring 42 and the casing 40 may also be used to mechanically fasten the two together.

In some forms, the protrusions 64 and/or the standoff ring 48 and 50 may be replaced by other forms that provide for an interference fit. In one embodiment, the protrusions 64 can be replaced with a depression/indentation/cutout that interacts with the standoff rings 48 and 50, or other similar structure, to provide an interference fit. In like manner, the standoff rings 48 and 50 can be replaced with a depression/indentation/cutout that interacts with the protrusions 64. Various combinations of such depressions/indentations/cutouts and the protrusions 64 and standoff rings 48 and 50 may be created to form an interference fit. As will be appreciated, therefore, there are a multitude of combinations of abutment structures that may lead to an interference fit for the casing 40 to the containment ring 42.

In some embodiments the containment ring 42 may have detachable protrusions 64 and/or detachable ends 62. In such an embodiment the protrusions 64 or ends 62 may be attached to the containment ring 42 after the containment ring 42 is placed around the casing 40. The protrusions 64 or ends 62 could be secured in place by any suitable fastening technique which may include, but need not be limited to, bolting, riveting, welding, and the like.

Figure 4:
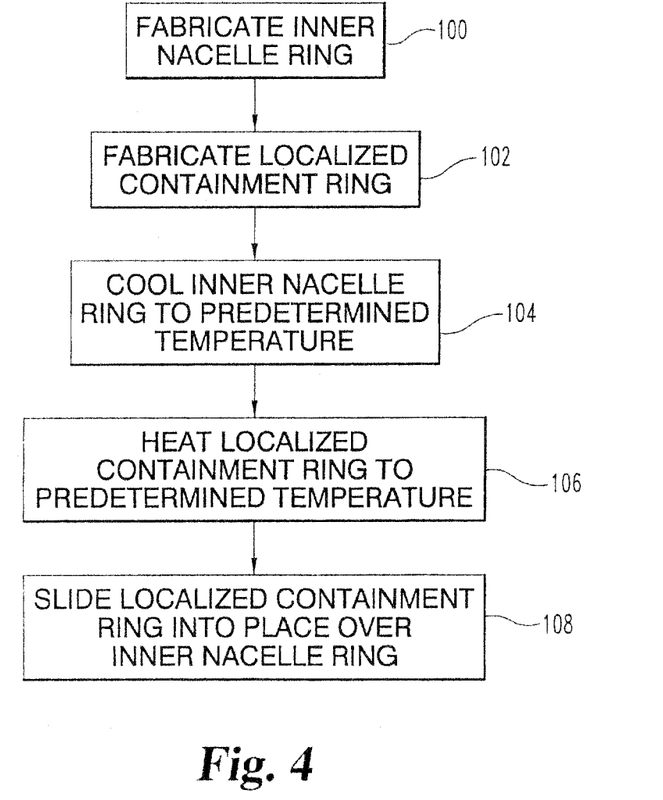
FIG. 4 is a flow chart of one method of making and assembling a containment system for a gas turbine engine.

Referring to FIG. 4, one form of assembling the fan containment system 12 is depicted. At step 100, the casing 40 set forth and described in detail above is formed or fabricated using any variety of suitable techniques. In one non-limiting embodiment the casing 40 is formed using composite construction techniques. At step 102, the containment ring 42 set forth and described in detail above is formed or fabricated, also with any variety of suitable techniques. In one non-limiting example, the containment ring 42 is formed using machining techniques. Though step 102 is depicted as following step 100, some embodiments are contemplated in which step 102 may occur in time before step 100. As such, the steps depicted in FIG. 4 need not be chronologically related to one another.

After the casing 40 has been constructed/assembled, it is subjected to a heat transfer process over at least a portion of its structure so that it has a relatively cool temperature, as shown in step 104. If the casing 40, or a portion thereof, is already at such a relatively cool temperature then the heat transfer process may not be needed. Such a heat transfer process causes an outside diameter of at least a portion of the casing 40 to shrink or become somewhat smaller. In any event, the thermal expansion properties of the material that the casing 40 is constructed of determines a size/dimension of the casing 40 at any given temperature. In other words, the cooler the casing 40, the smaller its size/dimension. In an analogous manner, the containment ring 42 is subjected to a heat transfer process over at least a portion of its structure so that it has a relatively high temperature, which is illustrated at step 106. If the containment ring 42, or a portion thereof, is already at such a relatively high temperature then the heat transfer process may not be needed. Such a heat transfer process, or a relatively high temperature, causes the containment ring 42 to grow or expand. In any event, the thermal expansion properties of the material that the containment ring 42 is constructed of determines a size/dimension of the containment ring 42 at any given temperature. In other words, the warmer the casing 40, the larger its size/dimension. If the containment ring 42 is not at a higher relative temperature than the casing 40, it may not be possible to pass the containment ring 42 around the casing 40. The protrusions 64 may prevent placement of the containment ring 42 around the casing 40 in such a situation.

Once the casing 40 and the containment ring 42 reach a suitable temperature, the containment ring 42 may be slid, or dropped, or otherwise placed around the standoff rings 48 and 50 of the casing 40, which is represented at step 108. As the containment ring 42 cools and the casing 40 warms to a similar temperature, the containment ring 42 shrinks and the casing 40 expands to couple the two respective structures. Such a coupling can create a tight interference fit.

Other activities can also be used to assemble the containment system 12. For example, although not illustrated in FIG. 4, the front portion of the casing 40 can be riveted or bolted to a section of the containment ring 42 as well. This may help support the front of the casing 40 located toward the air inlet 14 in the event that an aft portion of the casing 40 becomes separated. The containment ring 42 may also be clocked to a particular circumferential orientation if desired. Other activities are also contemplated herein.

In operation, the casing 40 may be exposed to heat generated from the gas turbine engine 10, while the containment ring 42 may be exposed to relatively cooler atmospheric environment resulting in a temperature difference between the casing 40 and the containment ring 42. As a result, the casing 40 may expand during normal operation of the gas turbine engine 10 while the containment ring 42 contracts. The expansion of the casing 40 may create an interference fit between the casing 40 and the containment ring 42 during normal operation of the gas turbine engine 10. Such expansion and contraction may create an even tighter connection between the two respective structures during flight.

One aspect of the present application provides a containment system for rotating turbomachinery, comprising a gas turbine engine flow path structure having an annular shape, an outer ring located radially outward of the gas turbine engine flow path structure, the outer ring operable to be at least partially radially in-line with a rotating blade of a gas turbine engine, and an abutment structure coupling the outer ring to the gas turbine engine flow path structure in a friction fit.

Another aspect of the present application provides a rotating component safety device comprising a gas turbine engine containment ring having radial press fit locating features operable to be coupled to a structure via differential temperature treatment, the containment ring enclosing at least part of the structure.

A further aspect of the present application provides an apparatus comprising a fan casing, a containment ring, and means for friction fit coupling the fan casing to the containment ring.

Still a further aspect of the present application provides a method comprising subjecting a containment ring and an annular flowpath structure to a heat transfer process, the heat transfer process resulting in a difference in temperature between the containment ring and the flowpath structure, placing the containment ring around the annular flowpath structure, and coupling the containment ring to the annular flowpath structure. The placing can include aligning a central axis of the containment ring with a central axis of the annular flowpath structure and translatingly moving the containment ring along its central axis.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A containment system for rotating turbomachinery, comprising:
    a gas turbine engine flow path structure having an annular shape;
    an outer ring located radially outward of the gas turbine engine flow path structure, the outer ring operable to be at least partially radially in-line with a rotating blade of a gas turbine engine, wherein the outer ring includes first and second protrusions extending radially inward from a surface to form an inner space of the outer ring; and
    an abutment structure coupling the outer ring to the gas turbine engine flow path structure in an interference fit;
    wherein the gas turbine engine flow path structure includes first and second standoffs extending from the same base, wherein the standoffs and base form a monolithic structure, the first and second standoffs forming a portion of the abutment structure coupling the outer ring to the gas turbine engine flow path structure;
    wherein the first and second standoffs are located between the first and second protrusions.

2. The containment system of claim 1 wherein the outer ring is an integral structure, and wherein outer ring contacts the gas turbine engine flow path structure.

3. The containment system of claim 1 wherein the standoffs are circumferential standoff rings formed along an annular surface of the gas turbine engine flow path structure.

4. The containment system of claim 1 wherein the protrusions and the standoffs form at least part of the abutment structure coupling the outer ring to the gas turbine engine flow path structure.

5. The containment system of claim 4 wherein at least one of the protrusions is coupled to at least one of the standoffs with a mechanical fastener.

6. The containment system of claim 5 wherein the mechanical fastener is one of a rivet, a bolt, or a screw.

7. The containment system of claim 4 which further includes a containment cavity formed between the gas turbine engine flow path structure and the outer ring.

8. A rotating component safety device comprising:
    a gas turbine engine containment ring having first and second radial press fit locating features that extend radially inwardly from opposite sides of the containment ring, and
    a gas turbine engine fan casing having an annular shape base portion and first and second radial press fit locating features that both extend from the base portion;
    the containment ring having a radially inner open interior operable to be coupled to the gas turbine engine fan casing received into the radially inner open interior via an interference;

wherein the first and second radial press fit locating features of the fan casing extend radially outwardly toward the gas turbine engine containment ring, and the radial press fit locating features of the gas turbine engine fan casing are located axially inwardly of the radial press fit locating features of the gas turbine engine containment ring.

9. The device of claim 8 wherein the gas turbine engine containment ring includes a ribbed surface.

10. The device of claim 8 wherein the radial press fit locating features are formed in an inner diameter side of the gas turbine engine containment ring.

11. The device of claim 10 wherein the radial press fit locating features are formed as protrusions that extend from the inner diameter side of the gas turbine engine containment ring.

12. The device of claim 8 wherein the radial press fit locating features of the fan casing are complementary to the radial press fit locating features of the gas turbine engine containment ring.

13. The device of claim 8 wherein the fan casing may be formed from a material selected from the group consisting of aluminum and a light weight composite material, and the gas turbine engine containment ring may be formed from a material selected from the group consisting of steel, titanium, or a heavy-duty composite material.

14. An apparatus comprising:
a fan casing arrangement for a gas turbine engine including radially outwardly projecting means, wherein the radially outwardly projecting means includes a base portion and radially outwardly projecting first and second standoffs both extending from the base portion, wherein the base portion and radially outwardly projecting first and second standoffs form a monolithic structure;
a containment ring including radially inwardly projecting means, the radially inwardly projecting means including first and second protrusions extending radially inwardly; and
the radially outwardly projecting first and second standoffs of the radially outwardly projecting means and the radially inwardly projecting means being configured for interference fit coupling the fan casing to the containment ring;
wherein the first and second standoffs are located between the first and second protrusions.

15. A method comprising:
subjecting a containment ring and an annular flowpath structure to a heat transfer process, the heat transfer process resulting in a difference in temperature between the containment ring and the flowpath structure, the containment ring having a first engagement surface located upstream of a second engagement surface, the annular flowpath structure having a base portion and a first radially outwardly projecting receiving portion upstream of a second radially outwardly projecting receiving portion, wherein the first and second radially outwardly projecting receiving portions both extend from the base portion;
placing the containment ring around the annular flowpath structure;
locating the first engagement surface of the containment ring upstream of the first radially outwardly projecting receiving portion of the annular flowpath structure, and locating the second engagement surface of the containment ring downstream of the second radially outwardly projecting receiving portion of the annular flowpath structure; and
coupling the containment ring during assembly through the heat transfer process to the annular flowpath structure to form an interference fit between the first and second engagement surfaces and the respective first and second radially outwardly projecting receiving portions.

16. The method of claim 15 wherein the subjecting includes heating the containment ring to an elevated temperature relative to the flowpath structure.

17. The method of claim 16 wherein the subjecting includes cooling the flowpath structure to a depressed temperature relative to the containment ring.

18. The method of claim 15 wherein the placing includes aligning a central axis of the containment ring with a central axis of the annular flowpath structure and translatingly moving the containment ring along its central axis.

19. The method of claim 15 wherein the coupling includes alleviating the heat transfer process, wherein a difference in temperature during the coupling is less than the difference in temperature during the subjecting.

20. The method of claim 19 wherein the coupling includes engaging a locating feature of the containment ring with a locating feature of the annular flowpath structure.

* * * * *